United States Patent [19]

Heitz et al.

[11] Patent Number: 5,020,923

[45] Date of Patent: Jun. 4, 1991

[54] TRANSMISSION/GEARBOX VIBRATION DAMPING SYSTEM

[75] Inventors: Steven A. Heitz; Jeffery N. Fairchild; John Readman, all of Rockford, Ill.

[73] Assignee: Sundstrand Corporation, Rockford, Ill.

[21] Appl. No.: 116,771

[22] Filed: Nov. 4, 1987

[51] Int. Cl.⁵ .............................................. F16C 27/02
[52] U.S. Cl. ...................... 384/99; 384/221; 384/901
[58] Field of Search ............... 384/222, 221, 99, 296, 384/202, 220, 901

[56] References Cited

U.S. PATENT DOCUMENTS

| | | | |
|---|---|---|---|
| 2,460,629 | 2/1949 | Fawick | 74/305 |
| 2,548,905 | 4/1951 | Odenweller et al. | 116/27 |
| 3,109,317 | 11/1963 | Cousino et al. | 74/411 |
| 3,160,026 | 12/1964 | Rosen | 74/410 |
| 3,215,477 | 11/1965 | Arthur | 384/222 |
| 3,241,892 | 3/1966 | Oishei | 384/222 |
| 3,298,240 | 1/1967 | McDowell et al. | 74/411 |
| 3,298,762 | 1/1967 | Peck et al. | |
| 3,301,210 | 1/1967 | Oeland, Jr. | 114/20 |
| 3,321,989 | 5/1967 | Lowley | 74/443 |
| 3,854,349 | 12/1974 | Michling | 74/801 |
| 4,366,994 | 1/1983 | Yoshioka | 384/99 |

Primary Examiner—Lenard A. Footland
Attorney, Agent, or Firm—Wood, Phillips, Mason, Recktenwald & Vansanten

[57] ABSTRACT

A vibration damping system for a transmission or gearbox which includes rotatable components. A housing structure is provided for supporting and journalling an inner rotatable component drivingly coupled to a plurality of outer rotatable components defining a plural load path. A compliant bearing is disposed between the housing and the inner rotatable component. The compliant bearing includes a laminated structure having an inner bearing member journalled on the housing, an outer bearing member supporting and journalling the inner rotatable component, and a resilient damping layer sandwiched between the inner and outer bearing members. A liquid squeeze film is located between the outer bearing member and the inner rotatable component, and passages through the housing and the compliant bearing supply liquid for the squeeze film.

16 Claims, 1 Drawing Sheet

TRANSMISSION/GEARBOX VIBRATION DAMPING SYSTEM

FIELD OF THE INVENTION

This invention generally relates to a gearbox or other transmission device and, particularly, to an improved vibration or noise damping system.

BACKGROUND OF THE INVENTION

Gear box mechanisms sometimes require an isolation or damping system to minimize transmission of operating vibration or noise. An example is in the case of underwater craft, such as torpedoes are prone to radiate noise to the surrounding water. Various approaches have been taken to isolate or reduce noise from machinery, engines, transmissions or the like, including noise from the hull area of a torpedo. Compliant gears or vibration damping composite structures have been used.

For instance, compliant gears having elastomer layers or composites within the gear structure itself have been proposed for isolating noise from the meshing gears, such as in U.S. Pat. No. 2,460,629 to Fawick. A problem in using compliant gears is that the elastomers or other elastic materials undergo stress just like the gears themselves, and therefore must be fabricated accordingly. Copending application Ser. No. 944,926, filed Dec. 22, 1986, and assigned to the assignee of this invention, addresses the noise radiating problem by providing a novel composite wall structure designed to reduce low frequency vibrations as well as to dampen resonant vibrations. Such a composite wall structure, while being quite effective for its intended purpose, may be too expensive for some applications.

Copending application Ser. No. 087,653, filed Aug. 20, 1987, and assigned to the assignee of this invention, provides a vibration isolating mounting system for the gearbox itself, by providing a two-stage vibration mount between an inner housing structure and an outer housing structure, as well as between the outer housing structure and an appropriate supporting frame means.

The present invention addresses the problem of vibration or noise damping or isolation by providing a novel bearing means between a housing structure and an inner rotatable component, such as an output gear, the bearing means itself providing for noise damping.

SUMMARY OF THE INVENTION

An object of the invention, therefore, is to provide a new and improved vibration or noise damping system for a transmission, gearbox or the like.

In the exemplary embodiment of the invention, generally, a housing structure is provided for supporting and journalling an inner rotatable component, such as an output gear, drivingly coupled to a plurality of outer rotatable components, such as pinion gears. Preferably, the pinion gears are equally spaced angularly about the output gear to define a plural load path.

The invention contemplates compliant bearing means provided between the housing structure and the inner rotatable component. The bearing means include a laminated structure having an inner, cylindrical ring-like bearing member journalled on the housing; an outer, cylindrical ring-like bearing member supporting and journalling the inner rotatable component; and a resilient damping layer between the inner and outer bearing members.

The compliant bearing means, including the inner bearing member, the outer bearing member and the resilient damping layer can be laminated such as by molding or other bonding techniques to form a unitary, compliant bearing means. The damping layer may comprise elastomeric material and, contrary to compliant gears, the elastomeric material may be relatively soft because it does not carry any driving loads or stresses.

The invention also contemplates providing a liquid squeeze film located between the outer bearing member and the inner rotatable component or output gear. Preferably, the squeeze film is located in a recess extending 360° about the outer periphery of the outer bearing member. Conduit means are provided through the housing structure and the laminated bearing means for supplying the liquid to form the squeeze film. As the liquid, such as oil, works itself outwardly between the output gear and the bearing means, the oil simply is scavenged by the oil scavenging pump of the gearbox or transmission.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
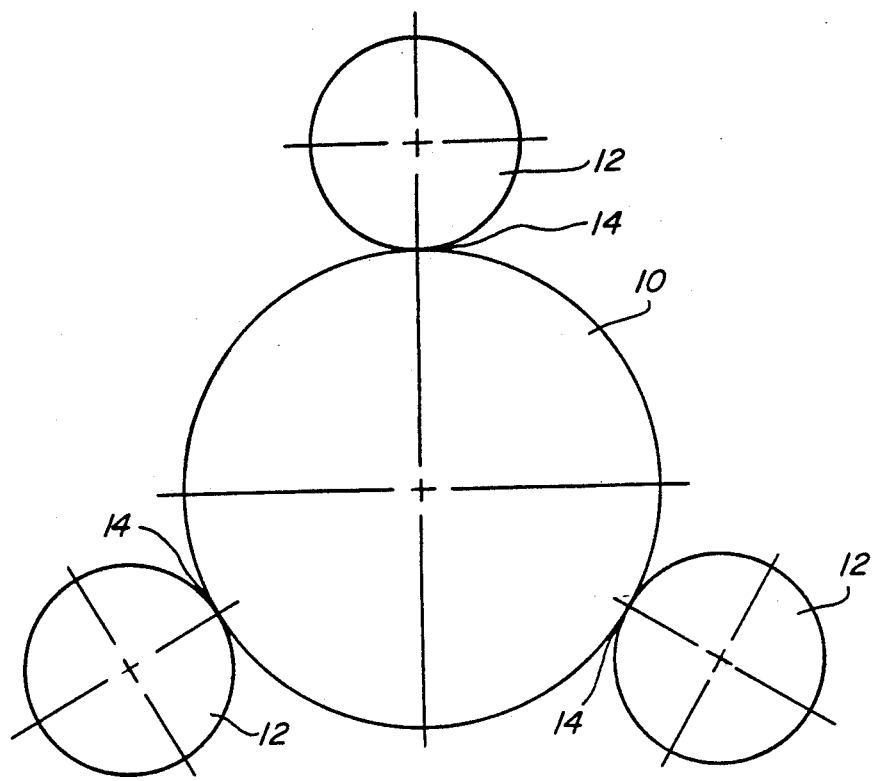
FIG. 1 is a schematic illustration of an output gear meshed with three pinion gears defining a triple load path transmission as might be used with the invention.

Referring to the drawings in greater detail, and first to FIG. 1, a schematic illustration of a triple load path gearbox or transmission is illustrated and includes an output gear 10 in mesh with three pinion gears 12. The pinion gears are spaced equally about the periphery of the output gear to define a balanced transmission incorporating the triple load path. Such a balanced transmission is quite applicable for incorporating the vibration or noise damping system therewith. In such a triple load path reduction gearbox, the lowest frequency noise is generated at the output gear meshing points 14 where the output gear meshes with the equally spaced pinion gears. There is a need to isolate the noise path from the output gear mesh into the gearbox housing of the transmission. This is accomplished by the vibration/noise damping system of the invention which is shown in FIG. 2.

Figure 2:
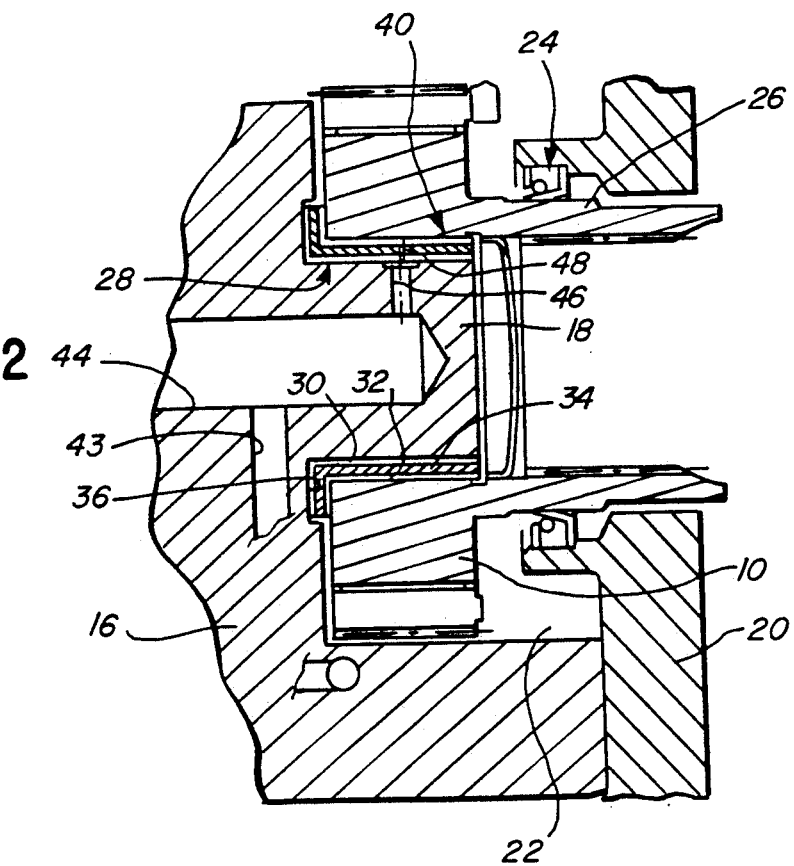
FIG. 2 is a longitudinal, axial section through the output gear and incorporating the vibration/noise damping system of the invention.

Referring to FIG. 2 in detail, output gear 10 is supported and journalled on a gearbox housing 16 which includes a generally cylindrical support portion 18. Pinion gears 12 (FIG. 1) are not illustrated in this Figure but are equally spaced about output gear 10, within the gearbox housing, at locations as illustrated in FIG. 1. As is common, the gearbox housing may include a portion 20 defining a gearbox cavity area 22, with seal means, generally designated 24, disposed between housing portion 20 and a projecting splined coupling portion 26 of output gear 10.

The invention contemplates compliant bearing means, generally designated 28, between housing 16 (i.e. housing support portion 18) and the inner rotatable component of the transmission, i.e. output gear 10. Bearing means 28 is formed as a laminated structure having an inner bearing member 30 journalled on housing support portion 18, an outer bearing member 32 supporting and journalling the hub portion of output gear 10, and a resilient damping layer 34 sandwiched between the inner and outer bearing members 30 and 32, respectively.

Inner bearing member 30, resilient damping layer 34 and outer bearing member 32 are cylindrical or generally ring-shaped and disposed about cylindrical support portion 18 of housing 16. As shown, all three members of the laminated structure are generally L-shaped for seating within a recessed area 36 of housing 16. This not only provides for axial support along the inside face of output gear 10 but also provides axial damping/noise-isolation between gear 10 and housing 16. Thereby, all metal-to-metal contact is prevented between gear 10 and housing 16.

Resilient damping layer 34 preferably is fabricated of elastomeric material which dampens vibration or noise between output gear 10 and housing 16. Inner and outer bearing rings 30 and 32 preferably are fabricated of metal. In essence, the elastomeric layer provides a barrier in the noise path between the output gear mesh and the housing which supports the gear. Preferably, the elastomeric member is bonded to the inner and outer bearing members 30 and 32, respectively, such as by molding the elastomeric layer between the bearing members or by appropriate adhesives. Therefore, the bearing means comprises an integral, unitary damping structure.

The invention also contemplates providing a liquid (oil) squeeze film 40 between outer bearing member 32 and output gear 10. The squeeze film is located on the outer peripheral surface of outer bearing member 32, preferably 360° thereabout. This squeeze film is particularly effective when used with a multiple balanced load transmission as described in relation to FIG. 1.

Generally, conduit means are provided through housing 16 and bearing means 28 for supplying liquid or oil to form squeeze film 40. Particularly, oil under pressure is directed from an appropriate source 43 through an axial bore 44 in housing 16 and housing support portion 18. A radial bore 46 communicates radially outwardly through housing support portion 18 in communication with a bore 48 extending through laminated bearing means 28 in communication with the outer periphery of outer bearing member 32. Therefore, oil under pressure defines the oil squeeze film 40 for further damping noise vibrations between output gear 10 and housing 16. The oil will flow outwardly between the output gear and the bearing means into housing cavity 22 whereupon the oil is scavenged by the conventional oil scavenging pump of the gearbox.

From the foregoing, it can be seen that the invention provides a simplified means for damping noise vibrations within a transmission or gearbox housing by defining a noise barrier directly under the output gear or inner rotatable component itself Greater latitudes in the selection of elastomeric materials are afforded, including much softer and more effective materials, than other systems incorporating compliant means directly in the gears themselves which are subject to the same stresses and loads of the gears.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A vibration damping system for a transmission and the like which includes rotatable components, comprising:
   a housing structure for supporting and journaling an inner rotatable component drivingly coupled to a plurality of outer rotatable components defining a plural load path; and
   compliant bearing means between the housing and the inner rotatable component, the bearing means including a laminated structure having an inner bearing member rotatably journaled on the housing, an outer bearing member supporting and rotatably journaling the inner rotatable component, and a resilient damping layer between and fixed to both the inner and outer bearing members.

2. The vibration damping system of claim 1 wherein said inner and outer bearing members comprise ring-like elements.

3. The vibration damping system of claim 2 wherein said resilient damping layer comprises an elastomeric element.

4. The vibration damping system of claim 1 wherein said resilient damping layer is molded between the inner and outer bearing members.

5. The vibration damping system of claim 1 wherein said resilient damping layer is bonded to the inner and outer bearing members.

6. The vibration damping system of claim 1 wherein said plurality of outer rotatable components are located equidistant angularly about the inner rotatable component, and including a liquid squeeze film located between the outer bearing member and the inner rotatable component.

7. The vibration damping system of claim 6, including conduit means through the housing structure and the bearing means for supplying the liquid to the outer periphery of the outer bearing member.

8. The vibration damping system of claim 6, wherein said squeeze film extends 360 about the periphery of the outer bearing member.

9. The vibration damping system of claim 6, including conduit means through the housing structure and the bearing means for supplying the liquid between the outer bearing member and the inner rotatable member.

10. A vibration damping system for a transmission and the like which includes rotatable components, comprising:
   a housing structure for supporting and journaling an inner rotatable component drivingly coupled to a plurality of outer rotatable components defining a plural load path; and
   compliant bearing means between the housing and the inner rotatable component, the bearing means including a laminated structure having an inner cylindrical ring-like bearing member rotatably journaled on the housing, an outer cylindrical ring-like bearing member supporting and rotatably journalling the inner rotatable component, and an elastomeric layer sandwiched between and bonded to both the inner and outer bearing members.

11. The vibration damping system of claim 10 wherein said resilient damping layer is molded between the inner and outer bearing members.

12. The vibration damping system of claim 10 wherein said plurality of outer rotatable components are located equidistant angularly about the inner rotatable component, and including a liquid squeeze film located between the outer bearing member and the inner rotatable component.

13. The vibration damping system of claim 12, including conduit means through the housing structure and the bearing means for supplying the liquid to the outer periphery of the outer bearing member.

14. The vibration damping system of claim 12 wherein said squeeze film extends 360° about the periphery of the outer bearing member.

15. The vibration damping system of claim 12, including conduit means through the housing structure and the bearing means for supplying the liquid between the outer bearing member and the inner rotatable member.

16. The vibration damping system of claim 10 wherein said laminated structure of the bearing means is generally L-shaped with a leg portion bearing against an axial end of the inner rotatable component.

* * * * *